June 8, 1926.
T. E. MITCHELL
COTTON PICKING MACHINE
Filed April 6, 1925
1,587,668
2 Sheets-Sheet 1
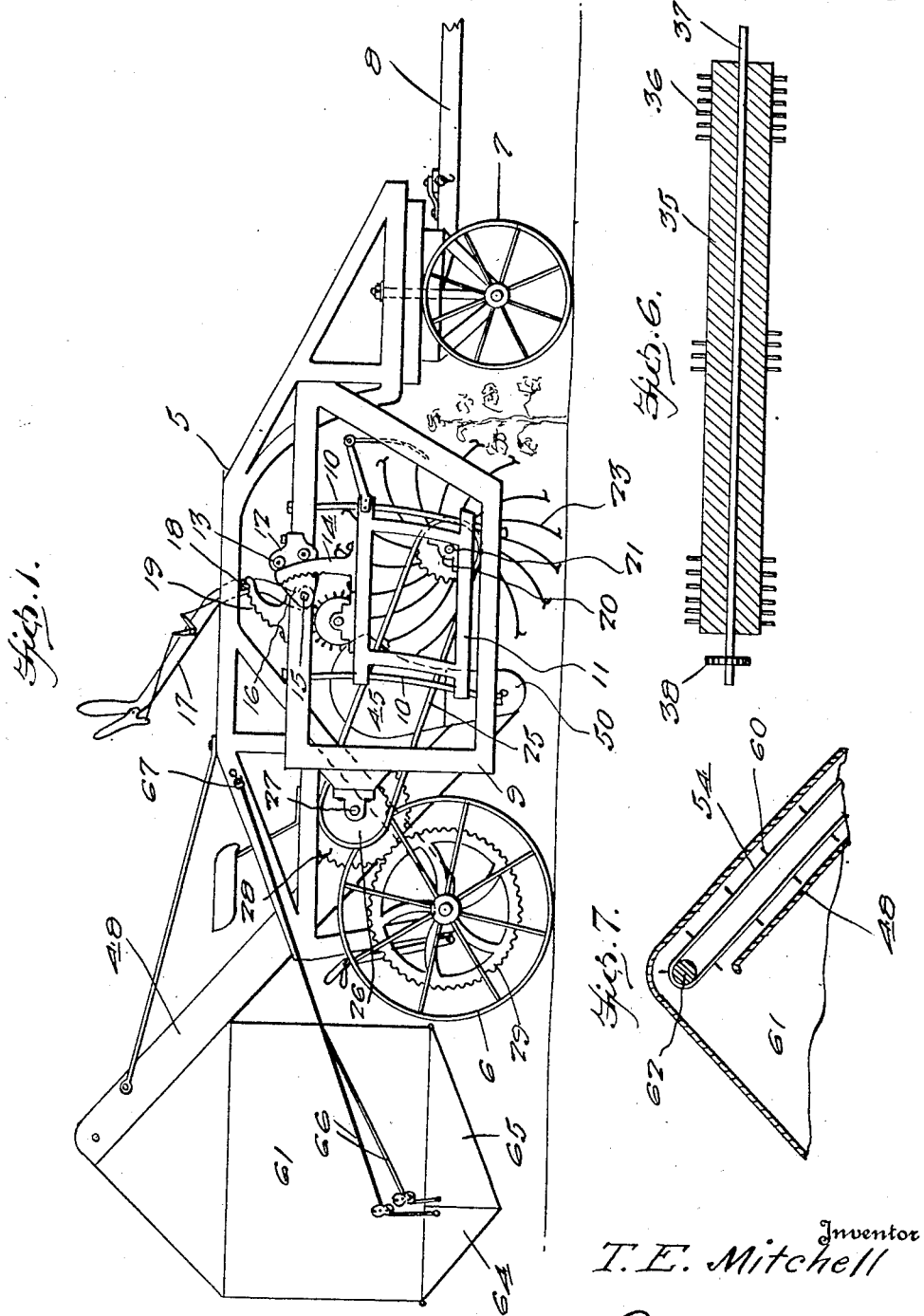
Inventor
T. E. Mitchell
By
Attorney June 8, 1926.
T. E. MITCHELL
COTTON PICKING MACHINE
Filed April 6, 1925
1,587,668
2 Sheets-Sheet 2
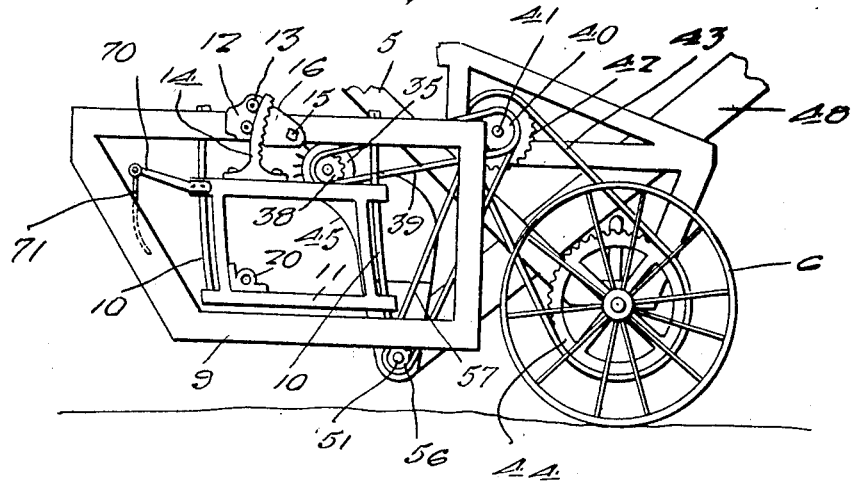
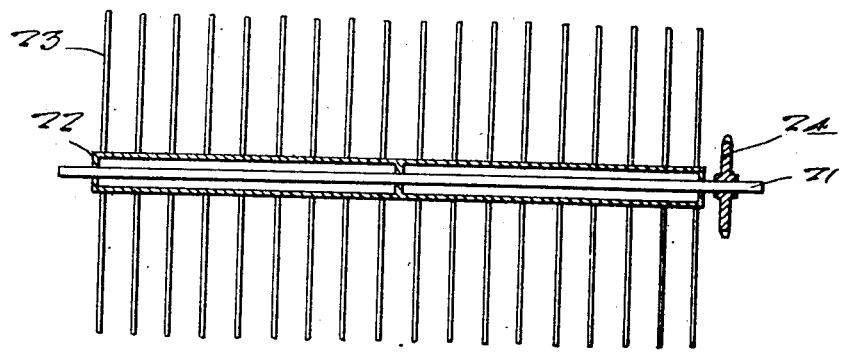
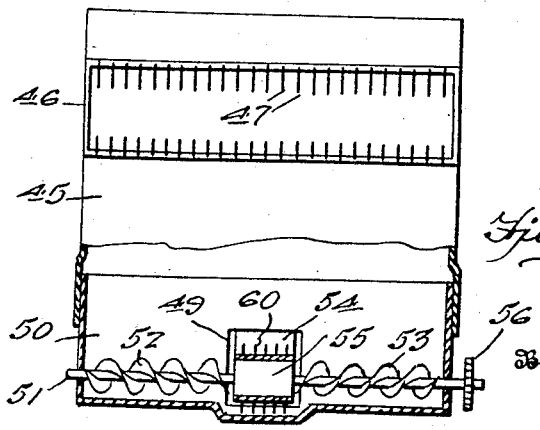
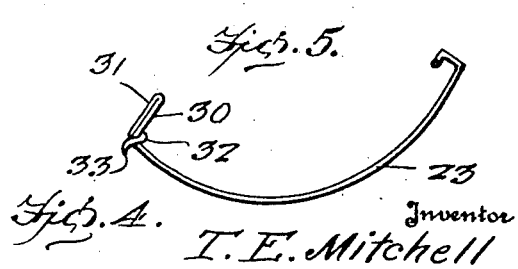
Inventor
T. E. Mitchell
By Clarence A? ____
Attorney Patented June 8, 1926.

1,587,668

UNITED STATES PATENT OFFICE.

THOMAS E. MITCHELL, OF KNOTT, TEXAS.

COTTON-PICKING MACHINE.

Application filed April 6, 1925. Serial No. 21,074.

The present invention relates to a cotton picking machine, and aims to provide an improved structure whereby a plurality of rows of cotton plants may be picked simultaneously by a machine which is driven by a single team of horses or in any other suitable manner.

An important object of the invention is to provide a machine of this nature, having a plurality of spring picker fingers, which pull the cotton from the plants, and a brush which takes the cotton from the pickers and delivers it into a hopper associated with a conveying mechanism, so that the cotton may be gathered in a suitable receptacle.

Another important object of the invention is to provide an exceedingly simple construction, which is thoroughly efficient and reliable in operation, not likely to become easily out of order, durable, strong, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawing:—

Figure 1 is an elevation of the machine, embodying the features of my invention.

Figure 2 is a fragmentary side elevation thereof opposite to that shown in Figure 1.

Figure 3 is a longitudinal section through the picker apparatus.

Figure 4 is a front elevation of the hopper, showing the lower portion in section.

Figure 5 is a detail view of one of the picker fingers.

Figure 6 is a longitudinal section through the brush, and

Figure 7 is a detail vertical section through the upper portion of the conveyor and receptacle.

Referring to the drawing in detail, it will be seen that 5 designates generally the frame of this machine, which is mounted on the rear wheels 6 and front wheels 7. A draft tongue 8 projects forwardly from the frame 5, being attached thereto in any preferred or desirable manner, so that the wheeled frame may be pulled along. Two side frames 9 are mounted on the wheel frame 5, and support arcuate bars 10, one pair in each side frame 9. A frame 11 is slidable on each pair of bars 10. A casting 12 is mounted on the upper portion of each side frame 9, and has journaled thereon a pair of rollers 13. Extending upwardly from each slidable frame 11 is an arcuate rack 14, the smooth edge of which engages the roller 13. A square shaft 15 is journaled through the upper portions of the side frames 9 and on its ends has rotatable therewith the gear segments 16, which mesh with the racks 14. A lever 17 is mounted on the shaft 15, for rotation thereof, and has a dog 18 engageable with a rack 19, so that this lever may be held in different adjusted positions. It will be seen that as the lever is rocked, it swings the gear segment 16, thereby lifting upwardly or lowering the slidable frames 11, through rods 14. Each rack 11 has, in its forward corner, a bearing 20 for receiving the shaft 21 of a drum 22, from which radiates a plurality of curved picker fingers 23. These picker fingers 23 are arranged on the drum in a plurality of annular series, so that a cotton plant may be received between two adjacent series, so that picker fingers will strip the plant of its cotton. A sprocket 24 is fixed to the shaft 21, and has trained thereover a chain 25, which is trained over a sprocket 26, mounted on shaft 27, journaled on the rear of one side frame 9. A gear 28 is rotatable with this shaft 27, and meshes with a gear 29 rotatable with one of the rear wheels 6. It will therefore be seen that as the wheeled frame 5 progresses forwardly, the drum 22 will be rotated, in a counter-clockwise direction, as illustrated in Figure 1, that is, in a direction opposite to the direction of rotation of the wheels 7 and 6. Particular attention is now called to the specific construction of the picker fingers 23. By referring to Figure 5, it will be seen that each picker finger has an arcuate curved body, and its free end is bent inwardly and radially thereof, as at 30, and then bent back over itself, as at 31, and the terminal is extended about the portions 30 and 31, as at 32, and terminates in an inwardly disposed sharpened hook like end 33. This hook like sharpened end 33 will engage the cotton on the plants, while the portions 30 and 31 will prevent the cotton from slipping down the body of the picker fingers. These fingers 23 are preferably formed of some suitable resilient material, and as may be seen in Figure 1, they move upwardly between the stalks and branches of the cotton plants and deliver the cotton to a brush 35, having a plurality of bristle teeth 36 thereon. The body of the brush 35 is rotatable by a shaft 37, journaled on the upper portions of the slidable frames 11. A sprocket 38 is mounted on the shaft 37 and has trained thereover a chain 39 which is also trained over a sprocket 40 carried by the shaft 41, which is provided with a sprocket 42, over which is trained a chain 43, in turn trained over sprockets 44 rotatable by the other rear wheel 6. The bristle teeth 36 of the drum 35 will take the cotton from the ends of the picker fingers 22 and deliver the same into a hopper 45, having an entrance opening 46, provided with comb teeth 47 for extending between the bristle teeth 36. The cotton will thus be dropped to the bottom of the hopper into the trough 48 of a conveyor mechanism, which is extended into an opening 49 provided in the bottom 50 of the hopper 45. In the bottom 50 there is journaled a shaft 51, having auger segments 52 and 53 filed in opposite directions, so as to direct the cotton toward the central opening 49 and engage the same with the belt 54 of the conveyor mechanism, which is trained over the roller 55 also on the shaft 51. A sprocket 56 is on the outer end of the shaft 51, and has trained thereover a chain 57 which, in turn, is trained over a sprocket (not shown) on the shaft 41. The belt 54 is provided with teeth 60, and will convey the cotton up the inclined trough 48 of the conveyor mechanism and deliver the same to a suitable receptacle 61, which depends from the upper end of the trough, as is shown to advantage in Figures 1 and 7. An idler roller 62 is provided in the upper end of the juncture of the trough with the receptacle over which the conveyor belt 54 is trained. The receptacle 61 has a pair of hinged bottoms 64 and 65 which are held close by cables 66 having their ends engaged with a hook 67, from which the ends may be disengaged so that the bottoms 64 and 65 may swing downwardly, so that the cotton collected in the receptacle may be dumped.

Arms 70 project forwardly from frame 11 and support fingers 71, which extend to knock sticks, etc., from the fingers 23.

From the foregoing description, it is thought to be obvious that a cotton picking machine constructed in accordance with my invention, is particularly well adapted for use, by reason of its convenience, reliability, and efficiency in operation, and it will also be obvious that my invention is susceptible of numerous changes in the details of construction, and in the combination and arrangement of parts, without departing from the spirit or scope of the invention, as hereinafter claimed, or sacrificing any of its advantages.

Having thus described my invention, what I claim as new is:—

1. In a cotton picking machine of the class described, a wheeled chassis, a pair of side frames supported by the chassis, a pair of auxiliary frames, a pair of arcuate bars mounted in each side frame, one of said auxiliary frames slidable on each pair of said bars, an arcuate rack extending upwardly from each auxiliary frame, a casting on each side frame having rollers journaled therein, for engaging the smooth side of the respective rack, a shaft journaled through the side frame, gear segments on the ends of the shaft meshing with the racks, and a lever for rotating the shaft, and cotton picking means supported in the auxiliary frame.

2. In a cotton picking machine of the class described, a wheeled chassis a pair of side frames supported by the chassis, a pair of auxiliary frames, a pair of arcuate bars mounted in each side frame, one of said auxiliary frames slidable on each pair of said bars, an arcuate rack extending upwardly from each auxiliary frame, a casting on each side frame having rollers journaled therein, for engaging the smooth side of the respective rack, a shaft journaled through the side frame, gear segments on the ends of the shaft meshing with the racks, a lever for rotating the shaft, and cotton picking means supported in the auxiliary frame, said means being in the form a picker drum including a plurality of spring picker fingers.

3. A picker drum for a cotton picking machine including a body, and a plurality of resilient fingers radiating therefrom, each finger including an arcuate body having its outer end radially extended inwardly of the arcuate body, and then bent over upon itself and curved about the first extension to terminate outwardly of the curvature of the body in an inwardly curved sharpened hook end.

In testimony whereof I affix my signature.

THOMAS E. MITCHELL.